3,259,643
UNSYMMETRICAL SALTS OF ALKYLENE BIS DITHIOCARBAMIC ACIDS AND PROCESS OF MAKING THE SAME

Lawrence H. Nash, P.O. Box 596, Belle Glade, Fla.
No Drawing. Filed Mar. 15, 1963, Ser. No. 265,340
12 Claims. (Cl. 260—429)

This application is a continuation-in-part of my co-pending patent application, Serial No. 841,930, filed September 24, 1959, now Patent No. 3,082,229.

This invention relates to new and improved derivatives of dithiocarbamic acid and method of making the same. These derivates are excellent insecticides, fungicides, bactericides and microbicides, when used either singularly or as an admixture with an inert carrier.

An object of this invention is to provide a more efficient insecticide, fungicide, bactericide and microbicide that is less toxic to either human, animal or plant life when used as a liquid, powder, emulsion, suspension or as an admixture to other agricultural plant nutriments than prior art compounds.

When the heavy metal salts of dithiocarbamic acid are prepared according to my invention, there are no side reactions, the finished product forming an acid solution, a neutral solution, in water.

In the prior art, when dialkali alkylene bis dithiocarbamates are treated with an acid in solution and brought to neutral, the alkylene bis dithiocarbamic acid is precipitated as a white or slightly yellow precipitate. This precipitate is not reactive with water soluble metallic salt to form heavy metal salts.

In my invention, the dialkali alkylene bis dithiocarbamates without being neutralized are reacted directly with water soluble heavy metal salts to form the heavy metal salts of alkylene bis dithiocarbamate having a pH less than 7, in aqueous solution.

My invention relates to a dimetallic dialkylene tetra dithiocarbamate where the metals are the same or different from each other, and the alkylene radicals are the same or different from each other, the metals having a valence of two, and the alkylene radicals having from two to six carbon atoms. In other words, the structural formula of the molecules of the compounds of my invention are unsymmetrical.

The general structural formula of the unsymmetrical compounds of my invention is:

$$\begin{array}{c} S\ \ H\ \ \ \ \ H\ \ S \\ \parallel\ \ |\ \ \ \ \ |\ \ \parallel \\ S-C-N-R-N-C-S \\ | \ \ \ \ \ \ \ \ \ \ \ \ \ \ \ \ \ | \\ M \ \ \ \ \ \ \ \ \ \ \ \ \ \ \ M' \\ | \ \ \ \ \ \ \ \ \ \ \ \ \ \ \ \ \ | \\ S-C-N-R'-N-C-S \\ \parallel\ \ |\ \ \ \ \ |\ \ \parallel \\ S\ \ H\ \ \ \ \ H\ \ S \end{array}$$

Where R and R' are alkylene radicals which may be the same or different from each other, having from two six carbon atoms, and M and M' are divalent metals which may be the same or different from each other. Whenever R and R' are the same, then M and M' are different from each other, and whenever M and M' are different from each other then R and R' may be the same or different from each other. M and M' may be different from each other and R and R' may be different from each other in the same molecule. The compounds of my invention are always unsymmetrical.

The compound must be made from a mixed dialkali alkylene bis dithiocarbamate where the two alkalies are different from each other, for example, sodium ammonium ethylene bis dithiocarbamate.

My process for making divalent heavy metal salts works best when using dialkali alkylene bis dithiocarbamate with two different alkali metals on the same molecule. If the same alkali metal, for example, disodium salts, were used, then only bis dithiocarbamates and not tetra dithiocarbamates would be formed.

The representative compounds formed according to my invention are:

Zinc butylene hexylene tetra dithiocarbamate, zinc manganous ethylene propylene tetra dithiocarbamate.

Dimanganous ethylene propylene tetra dithiocarbamate has the following structural formula:

$$\begin{array}{c} S\ H\ H\ H\ H\ S \\ \parallel\ |\ |\ |\ |\ \parallel \\ S-C-N-C-C-N-C-S \\ |\ |\ | \\ H\ H \\ Mn \ \ \ \ \ \ \ \ \ \ \ \ \ \ Mn \\ S\ H\ H\ H\ H\ S \\ \parallel\ |\ |\ |\ |\ \parallel \\ S-C-N-C-C-N-C-S \\ |\ |\ | \\ H\ H \end{array}$$

Dizinc butylene hexylene tetra dithiocarbamate has the following structural formula:

$$\begin{array}{c} S\ H\ H\ H\ H\ H\ S \\ \parallel\ |\ |\ |\ |\ |\ \parallel \\ S-C-N-C-C-C-C-N-C-S \\ |\ |\ |\ | \\ H\ H\ H\ H \\ Zn \ \ \ \ \ \ \ \ \ \ \ \ \ \ \ \ \ \ \ \ \ Zn \\ H\ H\ H\ H\ H \\ |\ |\ |\ |\ | \\ S-C-N-C-C-C-C-C-N-C-S \\ \parallel\ |\ |\ |\ |\ |\ |\ |\ \parallel \\ S\ H\ H\ H\ H\ H\ H\ S \end{array}$$

Zinc manganous ethylene propylene tetra dithiocarbamate has the following structural formula:

$$\begin{array}{c} S\ H\ H\ H\ S \\ \parallel\ |\ |\ |\ \parallel \\ S-C-N-C-C-N-C-S \\ |\ | \\ H\ H \\ Zn \ \ \ \ \ \ \ \ \ \ \ \ \ Mn \\ H\ H\ H \\ |\ |\ | \\ S-C-N-C-C-C-N-C-S \\ \parallel\ |\ |\ |\ |\ |\ \parallel \\ S\ H\ H\ H\ H\ S \end{array}$$

The above compounds may also be termed dimetallic alkylene bis alkylene bis dithiocarbamate for example, zinc, manganous ethylene propylene tetra dithiocarbamate can also be termed zinc manganous ethylene bis propylene bis dithiocarbamate.

In the process of making my novel compounds I found it very advantageous to work at reduced temperatures ranging from −20° to 5° F. when using an alcohol as a carrier, and using temperatures just above freezing point of water when using water as a carrier.

Examples of the formation of derivatives or alkylene bis dithiocarbamic acid, using both water and alcohol as the inert carrier are as follows:

Example 1

40 gms. of sodium hydroxide are dissolved in 400 gms. of water, 61 gms. of 99% ethylenediamine are mixed with 268 gms. of water. The two ingredients are added to a reaction vessel, which is closed and reduced in temperature to 5° C., 80 gms. of twenty-six degree Beaumé ammonium hydroxide and 152 gms. of carbon disulphide are added, the vessel closed and agitated until the temperature reaches 55° C. and the pressure is less than atmospheric. The product is sodium ammonium ethylene bis dithiocarbamate, which is then heated to 72° T. The loss on heating is 3½ gms. Any flocculation which takes place upon heating is removed by filtration. This bright yellow clear fluid is stable to temperatures within the range of −20° C. to 90° C., and does not decompose upon storage for two years.

The pH of the final product is 8.2. The structural formula of my product is:

Sodium ammonium ethylene bis dithiocarbamate

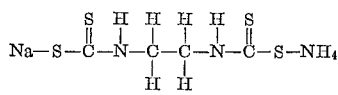

*Example 2*

40 gms. of sodium hydroxide are dissolved in 713 gms. of water and 83 gms. of 90% propylene diamine are added thereto. The reaction vessel is closed and the temperature reduced to 5° C. 80 gms. of twenty-six degree Beaumé ammonium hydroxide and 153 gms. of carbon disulphide are added, the vessel closed and agitated until the temperature reaches 55° C., and the pressure is less than atmospheric. The vessel is opened and heated to 72° C. The loss on heating is 3 gms. The compound is permitted to cool to room temperature and the black flocculation is removed by filtration. The bright clear yellow fluid is sodium ammonium propylene bis dithocarbamate. The same procedure was followed in forming sodium ammonium pentylene bis dithiocarbamate, and sodium ammonium hexylene bis dithiocarbamate. The structures and formula of these compounds are:

Sodium ammonium propylene bis dithiocarbamate

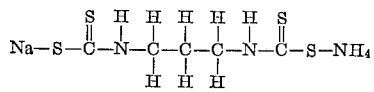

Sodium ammonium butylene bis dithiocarbamate

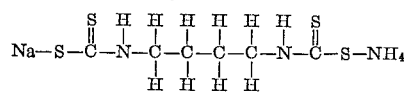

Sodium ammonium pentylene bis dithiocarbamate

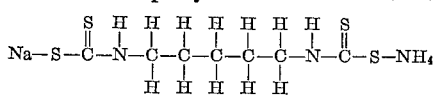

Sodium ammonium hexylene bis dithiocarbamate

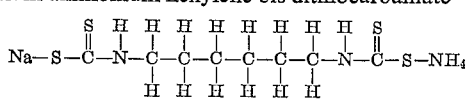

*Example 3*

The solutions of sodium ammonium ethylene bis dithiocarbamate in the amount as formed in Example 1 and the sodium ammonium propylene bis dithiocarbamate in the amount as formed in Example 2 are added with stirring to a solution of 205 gms. of commercial manganese sulphate (containing 27% manganese) and 182 gms. of zinc sulphate (containing 36% zinc) dissolved in 2000 gms. of hot water and filtered. The light tan colored precipitate, zinc manganous ethylene propylene tetradithocarbamate, is filtered from the solution and dried in a forced draft oven at 90° C., passed through a high speed grinder to form a free flowing powder, zinc manganous ethylene propylene tetradithiocarbamate. The structure of the compound being:

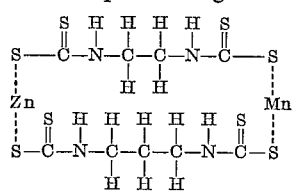

*Example 4*

51 gms. of 78% flake sodium hydroxide and 66 gms. of 85% potassium hydroxide are dissolved in 769 gms. of water and 61 gms. of ethylenediamine is added with stirring. The ingredients are cooled to 5° C. in a closed container. 153 gms. of carbon disulphide is then added to the reactor, which is agitated until the reaction reaches 55° C. and the pressure is less than atmospheric. The reactor is opened and the temperature is raised to 72° C. The loss on the increase of heat is 3½ gms. and the pH is 8.2, in aqueous solution. The sodium potassium ethylene bis dithiocarbamate formed in this manner has the same storage characteristics as described in the Example 1.

*Example 5*

1001 gms. of sodium ammonium ethylene bis dithiocarbamate as formed in Example 1 is added to a filtered 72° C. solution of 205 gms. of commercial manganese sulphate (containing 27% manganese) dissolved in 1000 gms. of water. Heat is applied while stirring and the temperature raised to 80° C. when the water insoluble manganous ethylene bis dithiocarbamate separates into a fine precipitate. The pH of the material is 6.4, in aqueous solution. The precipitate is filtered and dried in a forced draft oven at 80° C., and ground into a fine powder. The heavy metal salts having a valence of two other than manganese that can be used in my invention in addition to manganese are zinc, copper, iron, nickel, lead, mercury and cadmium. This is a true compound with no side reactions. The probable structural formula of my product is:

Manganous ethylene bis dithiocarbamate

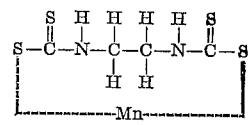

Where a single mole of water soluble metallic salt is reacted with one mole of dialkali alkylene bis dithiocarbamate, the general structure of the compound would be:

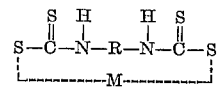

Where R is an alkylene radical having from two to six carbon atoms in the chain and M is a water soluble metallic salt, having a valence of two and chosen from zinc, manganese, mercury, iron cadmium, lead and nickel.

*Example 6*

2003 gms. sodium ammonium ethylene bis dithiocarbamate as formed in Example 1 is added to a hot filtered solution of 205 gms. of manganese sulphate (containing 27% manganese) and 182 gms. of zinc sulphate (containing 36% zinc) dissolved in 2000 gms. of water. Heat is applied with agitation of the material until the temperature reaches 80° C. The pH of the solution is 6.2, in aqueous solution. When agitation ceased a precipitate of zinc manganous ethylene bis dithiocarbamate forms. This precipitate is filtered and dried in a forced draft oven at 80° C. then ground to a fine powder. The compound is exceptionally fine and soft in comparison to the usual heavy metal salt of ethylene bis dithiocarbamate. It should be noted that the pH of the aqueous solution is much lower when formed from the sodium ammonium salt than when prepared from the disodium salt.

It is necessary to form the dimetallic salt of alkylene bis dithiocarbamate from the mixed dialkali salt of the bis dithiocarbamate. A preparation of 80% zinc manganous ethylene bis dithiocarbamate, 10% skim milk, 5% ammonium ligno sulfonate, and 5% finely ground clay is used at the rate of 1½ pounds of this mixture to 100 gallons of water and applied on a weekly schedule on potatoes for successful control of early and late blights. Hydroxyethyl cellulose, trimethylene triamine, urea-formaldehyde, flour and bone glue can replace the clay used in this particular formula. The structural formula of zinc manganous ethylene bis dithiocarbamate is:

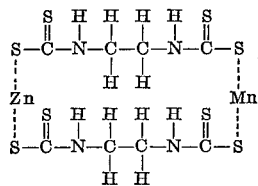

*Example 7*

The dimetallic salts of ethylene bis dithiocarbamate as formed in Example 6 were also processed with the sodium ammonium salts of propylene, butylene, pentylene and hexylene bis dithiocarbamates, forming the zinc manganous propylene bis dithiocarbamate, zinc manganous butylene bis dithiocarbamate, zinc manganous pentylene bis dithiocarbamate and zinc manganous hexylene bis dithiocarbamate. A general structure for compounds of this group is as follows:

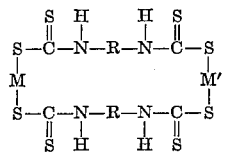

Where R is an alkylene radical having from two to six carbon atoms in the chain M and M' are different metals of water soluble salts, having a valence of two, and chosen from zinc, manganese, copper, mercury, iron, cadmium, lead and nickel.

In order to form the dimetallic alkylene bis dithiocarbamate having two different divalent metals, two moles of a mixed alkali alkylene bis dithiocarbamate must be used as a starting material to react with two moles of a mixture of one mole of a water soluble salt of a divalent metal and one mole of a water soluble salt of a different divalent metal.

*Example 8*

104 gms. of 78% flake sodium hydroxide is dissolved in 750 gms. of methanol and 61 gms. of 99% ethylenediamine is added with stirring. The temperature is reduced to —20° F. 153 gms. of carbon disulphide is added and the mixture is then agitated for one hour. The temperature reaches 55° C. and the pressure is less than atmospheric. The pH of the compound is 8.0. The alcohol is reclaimed by distillation. The compound is further dried with stirring, passed through a high speed grinder to form a free flowing powder. This powder is soluble in water in all proportions at room temperature up to a 50% solution. The compound formed is essentially a 100% disodium ethylene bis dithiocarbamate material and is used at one and a half pounds of the composition to one hundred gallons of water. When applied on tomatoes at this dilution using four ounces of ammonium ligno sulphonate as a wetting agent, my disodium ethylene bis dithiocarbamate gives a much higher yield than when commercial disodium ethylene bis dithiocarbamate made by the prior art processes.

Tests show that zinc manganous ethylene bis dithiocarbamate as compounded in Example 5 was more efficient than manganous ethylene bis dithiocarbamate prepared by the prior art for control of helminthosporium blight of corn.

Field tests show that sodium ammonium ethylene bis dithiocarbamate as prepared in Example 1 gives a higher yield of celery without the use of zinc sulphate than the disodium ethylene bis dithiocarbamate plus zinc sulphate prepared by the prior art, and vastly superior in yield than the disodium ethylene bis dithiocarbamate plus zinc sulphate prepared in a dry form commercially.

Tests show that the yield of potatoes when sprayed with zinc manganous ethylene bis dithiocarbamate as prepared in Example 6 is vastly superior to zinc ethylene bis dithiocarbamate, manganous ethylene bis dithiocarbamate, powdered disodium ethylene bis dithiocarbamate. These last four compounds were made according to the prior art, standard bordeaux mixture, N-trichloro-methylmercapto - 4 - cyclo - hexene - 1,2 - dicarboximide, and other compounds. The yield of potatoes in comparison to the amount of manganous ethylene bis dithiocarbamate used per acre shows that the zinc manganous ethylene bis dithiocarbamate prepared by Example 6 gave a yield of 520 bushels of potatoes per acre. The manganous ethylene bis dithiocarbamate prepared by the prior art gave a yield of 461 bushels per acre.

In a field experiment the spray program called for three quarts of sodium ammonium ethylene bis dithiocarbamate as prepared in Example 1. Instead of three quarts per 100 gallons of water, three gallons were accidentally used. The damage to the tomato plants was nil. It was used without the addition of zinc sulphate. If this concentration were used with prior art material, the plants would have been destroyed.

The alkalies suitable for use in my invention are sodium, ammonium, potassium, and lithium hydroxides, used alone or in combination.

The compounds disclosed in this invention are miscible with plant nutrients, agricultural insecticides in general, antibiotics, metallic fungicides such as copper hydroxide, sulphur, hexachlorophene and quaternary ammonium compounds, and sticking and wetting agents as recommended by the United States Department of Agriculture.

My compounds are also suitable for use in paints and lumber treating solutions to inhibit fungus.

The alcohols suitable for this invention are similar to those described in my Patent No. 2,900,293 dated August 18, 1958.

What I claim is:

1. Bis dithiocarbamates having an unsymmetrical molecule with the following structural formula:

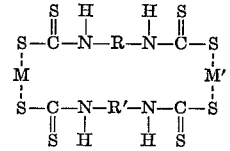

where R and R' are alkylene radicals having from three to six carbon atoms, and and M and M' are divalent metals.

2. Bis dithiocarbamates having an unsymmetrical molecule with the following structural formula:

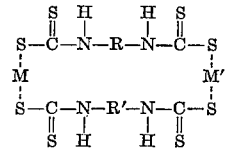

where R and R' are alkylene radicals having from two to six carbon atoms, and M and M' are divalent metals, whenever R and R' are the same as each other, they are alkylene radicals having from three to six carbon atoms and M and M' are different from each other, and whenever R and R' are different from each other they are alkylene radicals having from two to six carbon atoms.

3. Bis dithiocarbamates having an unsymmetrical molecule with the following structural formula:

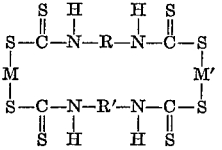

where R and R' are alkylene radicals having from two to six carbon atoms and M and M' are divalent heavy metals, wherein R and R' are different from each other, and M and M' are different from each other.

4. Bis dithiocarbamates in accordance with claim 1, in which M and M' are divalent metals selected from the group consisting of zinc, manganese, mercury, iron, cadmium, lead, copper and nickel.

5. Bis dithiocarbamates in accordance with claim 2, in which M and M' are divalent metals selected from the group consisting of zinc, manganese, mercury, iron, cadmium, lead, copper and nickel.

6. Bis dithiocarbamates in accordance with claim 3, in which M and M' are divalent metals selected from the group consisting of zinc, manganese, mercury, iron, cadmium, lead, copper and nickel.

7. Zinc manganous propylene bis dithiocarbamate having the following structural formula:

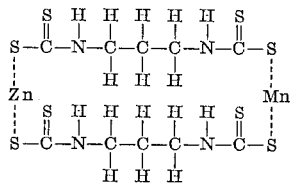

8. Zinc manganous ethylene bis propylene bis dithiocarbamate having the following structural formula:

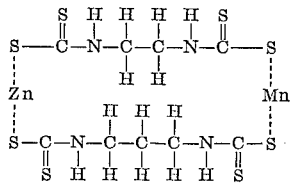

9. Dizinc butylene bis hexylene bis dithiocarbamate having the following structural formula:

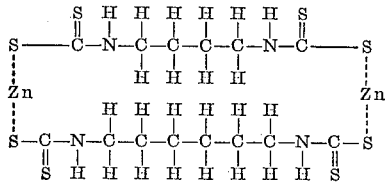

10. Dimanganous ethylene bis propylene bis dithiocarbamate having the following structural formula:

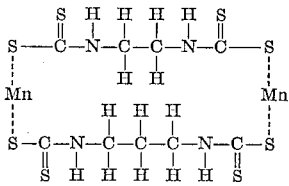

11. The process of making a heavy metal salt of an alkylene bis dithiocarbamate which consists of treating two moles of a mixed dialkali alkylene bis dithiocarbamate selected from the group consisting of two moles of said product and a mixture of one mole each of two different of said products by adding it to a solution of two moles of a divalent heavy metal salt, said divalent heavy metal salts being selected from the group consisting of zinc, manganese, copper, mercury, iron, cadmium, lead and nickel, and from a mixture of one mole each of two of said metal salts, heating and agitating the reaction mixture until the temperature reaches 80° C. and a precipitate is formed which is filtered, dried and ground to a fine powder giving as a product the heavy metal salt of the alkylene bis dithiocarbamate, said alkylene groups containing from 2 to 6 carbon atoms.

12. The process of making heavy metal salts of dimetallic dialkylene tetra dithiocarbamates wherein a solution consisting of one mole each of two different heavy metal salts is reacted with one mole of a dialkali alkylene bis dithiocarbamate and one mole of a different dialkali alkylene bis dithiocarbamate wherein the different dialkali alkylene bis dithiocarbamates each contains two different alkali metals and their alkylene groups are different from each other, said alkylene groups containing from 2 to 6 carbon atoms.

References Cited by the Examiner
UNITED STATES PATENTS

| | | | |
|---|---|---|---|
| 2,229,562 | 1/1941 | Gracia | 260—429 |
| 2,286,738 | 6/1942 | Hill | 260—500 |
| 2,317,765 | 4/1943 | Hester | 167—22 |
| 2,662,841 | 12/1953 | Fike | 167—22 |
| 2,693,485 | 11/1954 | Gobeil | 260—500 |
| 3,081,323 | 3/1963 | Greth | 260—429 |
| 3,082,229 | 3/1963 | Nash | 260—429 |

TOBIAS E. LEVOW, *Primary Examiner.*

F. R. OWENS, T. L. IAPALUCCI, *Examiners.*